(12) United States Patent
Sugimoto

(10) Patent No.: US 7,806,211 B2
(45) Date of Patent: Oct. 5, 2010

(54) INTERNAL COMBUSTION ENGINE SYSTEM, POWER OUTPUT APPARATUS, VEHICLE, AND METHOD FOR CONTROLLING THE INTERNAL COMBUSTION ENGINE SYSTEM

(75) Inventor: Hitoki Sugimoto, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 112 days.

(21) Appl. No.: 11/976,012

(22) Filed: Oct. 19, 2007

(65) Prior Publication Data

US 2008/0110439 A1 May 15, 2008

(30) Foreign Application Priority Data

Nov. 10, 2006 (JP) ............................... 2006-305032

(51) Int. Cl.
*B60K 6/00* (2007.10)
(52) U.S. Cl. ..................... 180/65.28; 180/65.275; 180/65.21
(58) Field of Classification Search .............. 180/65.28, 180/65.265, 65.275; 123/321, 322; 60/282, 60/299
See application file for complete search history.

(56) References Cited

U.S. PATENT DOCUMENTS 6,253,866 B1 * 7/2001 Kojima .................. 180/65.235

FOREIGN PATENT DOCUMENTS

| JP | 61-252848 | 11/1986 |
|----|-----------|---------|
| JP | 03-068218 | 3/1991 |
| JP | 08312410 A | * 11/1996 |
| JP | 11-332021 | 11/1999 |
| JP | 11-343901 | 12/1999 |
| JP | 2000-045922 A | 2/2000 |
| JP | 2002-242711 A | 8/2002 |
| JP | 2002-332890 A | 11/2002 |
| JP | 3803215 | 5/2006 |

* cited by examiner

*Primary Examiner*—Paul N Dickson
*Assistant Examiner*—Katy Meyer
(74) *Attorney, Agent, or Firm*—Kenyon & Kenyon LLP

(57) ABSTRACT

When a catalyst temperature $\theta c$ is higher than a threshold value $\theta ref$ (S320), an increase coefficient Kf is set so as to tend to be larger as opening and closing timing of an intake valve is advanced, an intake air flow Qa is larger, and a rotation speed Ne of the engine 22 becomes higher (S340), a target fuel injection quantity Qf* is set based on a product of a basic fuel injection quantity Qftmp set based on the intake air flow Qa and an increase coefficient Kf (S350), and fuel injection of the set target fuel injection quantity Qf* is performed (S360).

7 Claims, 11 Drawing Sheets

INTERNAL COMBUSTION ENGINE SYSTEM, POWER OUTPUT APPARATUS, VEHICLE, AND METHOD FOR CONTROLLING THE INTERNAL COMBUSTION ENGINE SYSTEM

BACKGROUND

1. Technical Field

The present invention relates to an internal combustion engine system, a power output apparatus, a vehicle, and a method for controlling the internal combustion engine system.

2. Related Art

Conventionally, as an internal combustion engine system of this kind, there has been proposed the one that implements increase of fuel until the catalyst temperature becomes not higher than the second temperature which is lower than the first temperature, or the catalyst temperature is a temperature between the first temperature and the second temperature and the continuation time of increase of fuel becomes a predetermined time or more, when the catalyst temperature which is the temperature of the catalyst converter disposed in the exhaust system of the engine becomes the first temperature or higher (see Patent Document 1, for example).

[Patent Document 1]: Japanese Patent Laid-Open No. 2002-332890

SUMMARY

In such an internal combustion engine system, increase of fuel is implemented in order to lower the temperature of the catalyst, but when the increase of fuel is implemented, it is desired to determine the degree of increase more properly. It is conceivable to be one of the objects to determine increase to what extent is performed when implementing increase of fuel, for example, in an internal combustion engine system including a variable valve timing mechanism capable of changing opening and closing timing of an intake valve. This is because when the quantity of fuel to be increased is too small, the temperature of the catalyst sometimes cannot be sufficiently lowered, and when the quantity of fuel to be increased is too large, increase in fuel consumption may be caused.

The internal combustion engine system, the power output apparatus, the vehicle, and the method for controlling the internal combustion engine system of the present invention have an object to operate an internal combustion engine more properly by setting a target fuel injection quantity to be injected to each of cylinders of the internal combustion engine more properly.

In order to achieve the above described object, the internal combustion engine system, the power output apparatus including the same, the vehicle loaded with the same, and the method for controlling the internal combustion engine system adopt the following configurations.

The present invention is directed to a first internal combustion engine system which has an opening and closing timing changing module capable of changing opening and closing timing of an intake valve of an internal combustion engine. The first internal combustion engine system includes: a fuel injection module capable of injecting a fuel to each cylinder of the internal combustion engine; an advance angle instruction module which performs an advance angle instruction for advancing opening and closing timing of the intake valve when predetermined high torque demand is made based on an operation of an operator; an opening and closing timing control module which controls the opening and closing timing changing module so that the intake valve is opened and closed in target opening and closing timing based on an operation state of the internal combustion engine and presence or absence of an advance angle instruction by the advance angle instruction module; a target fuel injection quantity setting module which sets a target fuel injection quantity based on target power to be output from the internal combustion engine and presence or absence of the advance angle instruction by the advance angle instruction module; and a fuel injection control module which controls the fuel injection module so that fuel injection is performed based on the set target fuel injection quantity.

In the first internal combustion engine system of the present invention, an opening and closing timing changing module is controlled so that an intake valve is opened and closed in target opening and closing timing based on the operation state of an internal combustion engine, and presence or absence of an advance angle instruction which is performed to advance the opening and closing timing of the intake valve when predetermined high torque demand is made based on an operation of an operator, and the target fuel injection quantity is set based on the target power to be output from the internal combustion engine and presence or absence of the advance angle instruction, and the fuel injection module is controlled so that fuel injection is performed based on the set target fuel injection quantity. Specifically, fuel injection is performed based on the presence or absence of the advance angle instruction in addition to the target power. Accordingly, if the target fuel injection quantity is properly set in accordance with the advance angle instruction, the internal combustion engine can be operated more properly. Here, "the predetermined high torque demand" can be the demand which is made when the accelerator operation quantity is the predetermined operation quantity or more when this internal combustion engine system is loaded on a movable body such as a vehicle. Further, "the operation state of the internal combustion engine" includes the rotation speed and the like of the internal combustion engine.

In one preferable embodiment of the first internal combustion engine system of the present invention, the first internal combustion engine system may further include an exhaust gas purifier which includes a catalyst for purifying exhaust gas from the internal combustion engine. And the target fuel injection quantity setting module may be a module which sets the target fuel injection quantity based on the target power and presence or absence of an advance angle instruction by the advance angle instruction module when a temperature of the catalyst is higher than a predetermined temperature. By this, the target fuel injection quantity can be set with the presence or absence of the advance angle instruction taken into consideration when the temperature of the catalyst is relatively high. In this case, the module which sets the target fuel injection quantity based on the target power without considering the advance angle instruction when the temperature of the catalyst is the predetermined temperature or lower can be adopted.

In another preferable embodiment of the first internal combustion engine system of the present invention, the target fuel injection quantity setting module may be a module which sets the target fuel injection quantity based on a basic fuel injection quantity set based on the target power and a predetermined constraint, and a correction value set based on presence or absence of an advance angle instruction by the advance angle instruction module. By this, the target fuel injection quantity can be set by using the correction value in accordance with the presence or absence of the advance angle instruction. In the first internal combustion engine system of the present invention of this mode, the target fuel injection quantity setting module may be a module which sets the target fuel injection quantity based on a product of the basic fuel injection quantity, and a correction value for which a larger value is set when an advance angle instruction by the advance angle instruction module is performed than when the advance angle instruction is not performed. Further, the target fuel injection quantity setting module may be a module which sets the target fuel injection quantity by using the correction value which is set based on presence or absence of an advance angle instruction by the advance angle instruction module, a rotation speed of the internal combustion engine, and an intake air flow of the internal combustion engine. In the case of the latter, the target fuel injection quantity setting module may be a module which sets the target fuel injection quantity based on a product of the basic fuel injection quantity and the correction value for which a larger value is set as the rotation speed of the internal combustion engine is higher and as the intake air flow of the internal combustion engine is larger. In the case of them, the target fuel injection quantity can be set by using the correction value which is set more properly.

The present invention is directed to a second internal combustion engine system which has an opening and closing timing changing module capable of changing opening and closing timing of an intake valve of an internal combustion engine. The second internal combustion engine system includes: a fuel injection module capable of injecting a fuel to each cylinder of the internal combustion engine; a target fuel injection quantity setting module which sets a target fuel injection quantity based on target power to be output from the internal combustion engine and opening and closing timing of the intake valve; and a fuel injection control module which controls the fuel injection module so that fuel injection is performed based on the set target fuel injection quantity.

In the second internal combustion engine of the present invention, the target fuel injection quantity is set based on the target power to be output from the internal combustion engine and the opening and closing timing of the intake valve, and the fuel injection module is controlled so that fuel injection is performed based on the set target fuel injection quantity. Specifically, fuel injection is performed based on the target fuel injection quantity set with the opening and closing timing of the intake valve into consideration in addition to the target power. Accordingly, by properly using the opening and closing timing of the intake valve, the target fuel injection quantity can be set more properly, and the internal combustion engine can be operated more properly.

In one preferable embodiment of the second internal combustion engine system of the present invention, the second internal combustion engine system may further include an exhaust gas purifier which includes a catalyst for purifying exhaust gas from the internal combustion engine. The target fuel injection quantity setting module may be a module which sets the target fuel injection quantity based on the target power and the opening and closing timing of the intake valve, when a temperature of the catalyst is higher than a predetermined temperature. By this, the target fuel injection quantity can be set with the opening and closing timing of the intake valve taken into consideration when the temperature of the catalyst is relatively high. In this case, the module which sets the target fuel injection quantity based on the target power without considering the opening and closing timing of the intake valve, when the temperature of the catalyst is the predetermined temperature or lower can be also adopted.

In another preferable embodiment of the second internal combustion engine system of the present invention, the second internal combustion engine system may further include an opening and closing timing control module which controls the opening and closing timing changing module so that the opening and closing timing of the intake valve is at an advance angle side when predetermined high torque demand is made based on an operation of an operator as compared when the predetermined high torque demand is not made. By this, the target fuel injection quantity corresponding to whether the predetermined high torque demand is made or not can be set. Here, "the predetermined high torque demand" can be the demand which is made when the accelerator operation quantity is a predetermined operation quantity or more when the internal combustion engine system is loaded on a movable body such as a vehicle.

In still another preferable embodiment of the second internal combustion engine system of the present invention, the target fuel injection quantity setting module may be a module which sets the target fuel injection quantity based on a basic fuel injection quantity which is set based on the target power and a predetermined constraint, and a correction value which is set based on the opening and closing timing of the intake valve. By this, the target fuel injection quantity can be set by using a correction value corresponding to the opening and closing timing of the intake valve. In the second internal combustion engine system of the present invention of this mode, the target fuel injection quantity setting module may be a module which sets the target fuel injection quantity based on a product of the basic fuel injection quantity and a correction value for which a larger value is set as the opening and closing timing of the intake valve is toward an advance angle side in a range it can take. Further, the target fuel injection quantity setting module may be a module which sets the target fuel injection quantity by using the correction value which is set based on the opening and closing timing of the intake valve, a rotation speed of the internal combustion engine and an intake air flow of the internal combustion engine. In the case of the latter, the target fuel injection quantity setting module may be a module which sets the target fuel injection quantity based on a product of the basic fuel injection quantity and the correction value for which a larger value is set as the rotation speed of the internal combustion engine is higher and as the intake air flow of the internal combustion engine is larger. In the case of them, the target fuel injection quantity can be set by using the correction value which is set more properly.

The present invention is directed to a first vehicle. The first vehicle includes: an internal combustion engine; an opening and closing timing changing module capable of changing opening and closing timing of an intake valve of the internal combustion engine; a fuel injection module capable of injecting a fuel to each cylinder of the internal combustion engine; a rotation regulating module which is connected to an output shaft of the internal combustion engine, and a drive shaft independently rotatable with respect to the output shaft and connected to an axle, and capable of regulating a rotation speed of the output shaft with respect to the drive shaft with input and output of electric power and input and output of drive force to and from the output shaft and the drive shaft; a motor capable of inputting and outputting power to and from the drive shaft; an advance angle instruction module which performs an advance angle instruction to advance opening and closing timing of the intake valve when predetermined high torque demand is made based on an operation of an operator; an opening and closing timing control module which controls the opening and closing timing changing module so that the intake valve is opened and closed in target opening and closing timing based on the operation state of the internal combustion engine and presence or absence of the advance angle instruction by the advance angle instruction module; a target fuel injection quantity setting module which sets a target fuel injection quantity based on target power to be output from the internal combustion engine and presence or absence of an advance angle instruction by the advance angle instruction module; and a fuel injection control module which controls the fuel injection module so that fuel injection is performed based on the set target fuel injection quantity.

In the first vehicle of the present invention, an opening and closing timing changing module is controlled so that an intake valve is opened and closed in target opening and closing timing based on the operation state of an internal combustion engine, and presence or absence of an advance angle instruction which is performed to advance the opening and closing timing of the intake valve when predetermined high torque demand is made based on an operation of an operator, and the target fuel injection quantity is set based on the target power to be output from the internal combustion engine and presence or absence of the advance angle instruction, and the fuel injection module is controlled so that fuel injection is performed based on the set target fuel injection quantity. Specifically, fuel injection is performed based on the presence or absence of the advance angle instruction in addition to the target power. Accordingly, if the target fuel injection quantity is properly set in accordance with the advance angle instruction, the internal combustion engine can be operated more properly. Here, "the predetermined high torque demand" can be the demand which is made when the accelerator operation quantity is the predetermined operation quantity or more when this internal combustion engine system is loaded on a movable body such as a vehicle. Further, "the operation state of the internal combustion engine" includes the rotation speed and the like of the internal combustion engine.

In one preferable embodiment of the first vehicle of the present invention, the rotation regulating module may be a module which includes a three shaft-type power input output module which is connected to three shafts that are the output shaft of the internal combustion engine, the power shaft and a third shaft, and inputs and outputs power to and from a remaining shaft based on power input and output to and from any two shafts among the three shafts, and a generator capable of inputting and outputting power to and from the third shaft.

The present invention is directed to a second vehicle. The second vehicle includes: an internal combustion engine; an opening and closing timing changing module capable of changing opening and closing timing of an intake valve of the internal combustion engine; a fuel injection module capable of injecting a fuel to each cylinder of the internal combustion engine; a rotation regulating module which is connected to an output shaft of the internal combustion engine and a drive shaft independently rotatable with respect to the output shaft and connected to an axle, and capable of regulating a rotation speed of the output shaft with respect to the drive shaft with input and output of electric power and input and output of drive force to and from the output shaft and the drive shaft; a motor capable of inputting and outputting power to and from the drive shaft; a target fuel injection quantity setting module which sets a target fuel injection quantity based on target power to be output from the internal combustion engine and opening and closing timing of the intake valve; and a fuel injection control module which controls the fuel injection module so that fuel injection is performed based oh the set target fuel injection quantity.

In the second vehicle of the present invention, the target fuel injection quantity is set based on the target power to be output from the internal combustion engine and the opening and closing timing of the intake vale, and the fuel injection module is controlled so that fuel injection is performed based on the set target fuel injection quantity. Specifically, fuel injection is performed based on the target fuel injection quantity set with the opening and closing timing of the intake valve into consideration in addition to the target power. Accordingly, by properly using the opening and closing timing of the intake valve, the target fuel injection quantity can be set more properly, and the internal combustion engine can be operated more properly.

In one preferable embodiment of the second vehicle of the present invention, the rotation regulating module may be a module which includes a three shaft-type power input output module which is connected to three shafts that are the output shaft of the internal combustion engine, the power shaft and a third shaft, and inputs and outputs power to and from a remaining shaft based on power input and output to and from any two shafts among the three shafts, and a generator capable of inputting and outputting power to and from the third shaft.

The present invention is directed to a first method for controlling an internal combustion engine system which includes an opening and closing timing changing module capable of changing opening and closing timing of an intake valve of an internal combustion engine, and a fuel injection module capable of injecting a fuel to each cylinder of the internal combustion engine. The first method for controlling an internal combustion engine includes: performing an advance angle instruction for advancing opening and closing timing of the intake valve when predetermined high torque demand is made based on an operation of an operator; controlling the opening and closing timing changing module so that the intake valve is opened and closed in target opening and closing timing based on an operation state of the internal combustion engine and presence or absence of the advance angle instruction; and controlling the fuel injection module so that a target fuel injection quantity is set based on target power to be output from the internal combustion engine and presence or absence of the advance angle instruction, and fuel injection is performed based on the set target fuel injection quantity.

In the first method for controlling an internal combustion engine system of the present invention, an opening and closing timing changing module is controlled so that an intake valve is opened and closed in target opening and closing timing based on the operation state of an internal combustion engine, and presence or absence of an advance angle instruction which is performed to advance the opening and closing timing of the intake valve when predetermined high torque demand is made based on an operation of an operator, and the target fuel injection quantity is set based on the target power to be output from the internal combustion engine and presence or absence of the advance angle instruction, and the fuel injection module is controlled so that fuel injection is performed based on the set target fuel injection quantity. Specifically, fuel injection is performed based on the presence or absence of the advance angle instruction in addition to the target power. Accordingly, if the target fuel injection quantity is properly set in accordance with the advance angle instruction, the internal combustion engine can be operated more properly. Here, "the predetermined high torque demand" can be the demand which is made when the accelerator operation quantity is the predetermined operation quantity or more when this internal combustion engine system is loaded on a movable body such as a vehicle. Further, "the operation state of the internal combustion engine" includes the rotation speed and the like of the internal combustion engine.

The present invention is directed to a second method for controlling an internal combustion engine system including an opening and closing timing changing module capable of changing opening and closing timing of an intake valve of an internal combustion engine, and a fuel injection module capable of injecting a fuel to each cylinder of the internal combustion engine. The second method for controlling an internal combustion engine system includes: setting a target fuel injection quantity based on target power to be output from the internal combustion engine and opening and closing timing of the intake valve, and controlling the fuel injection module so that fuel injection is performed based on the set target fuel injection quantity.

In the second method for controlling an internal combustion engine system of the present invention, the target fuel injection quantity is set based on the target power to be output from the internal combustion engine and the opening and closing timing of the intake valve, and the fuel injection module is controlled so that fuel injection is performed based on the set target fuel injection quantity. Specifically, fuel injection is performed based on the target fuel injection quantity set with the opening and closing timing of the intake valve into consideration in addition to the target power. Accordingly, by properly using the opening and closing timing of the intake valve, the target fuel injection quantity can be set more properly, and the internal combustion engine can be operated more properly.

DESCRIPTION OF THE PREFERRED EMBODIMENTS

Figure 1:
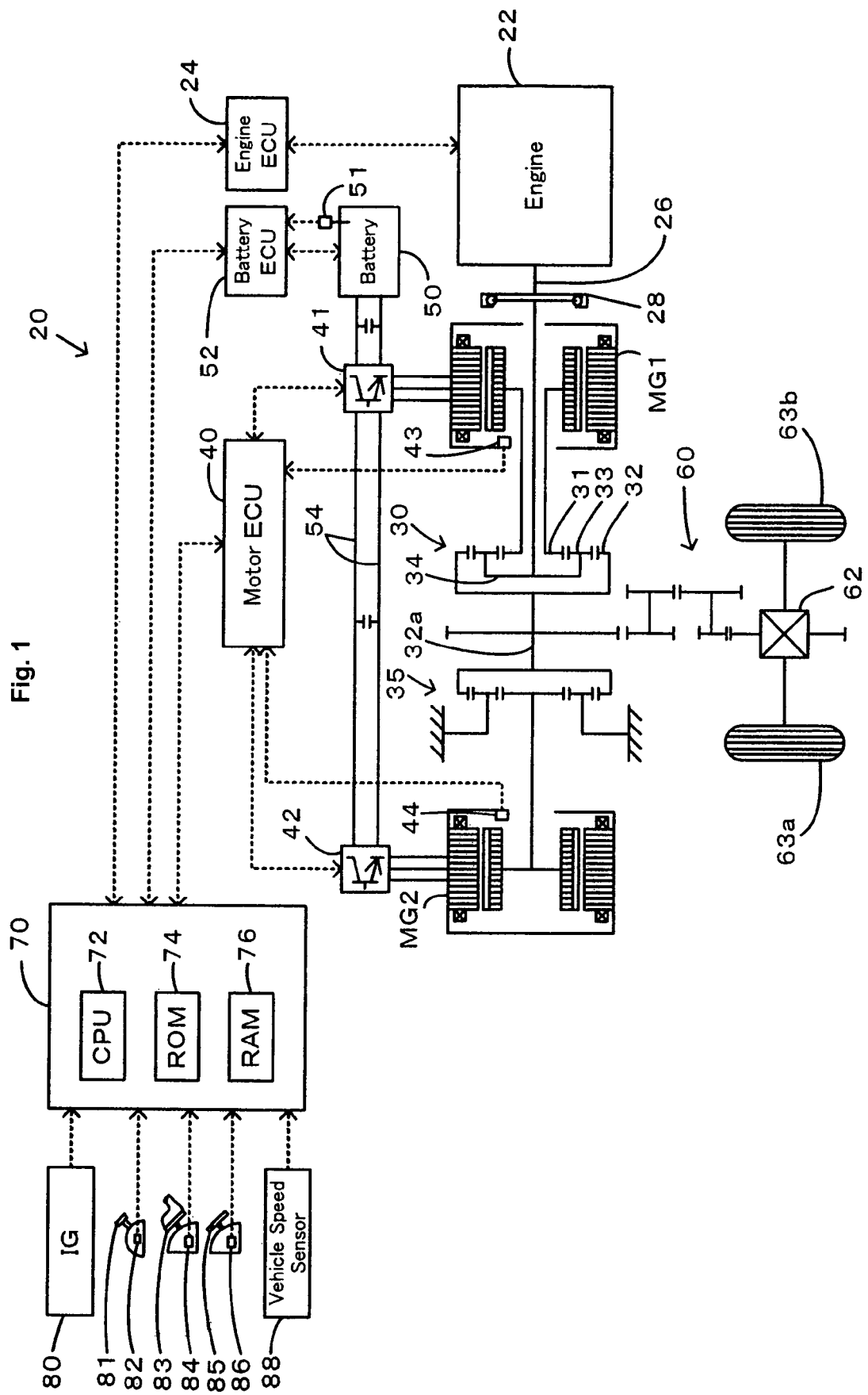
FIG. 1 is a block diagram showing an outline of a constitution of a hybrid automobile 20 which is one embodiment of the present invention.

Next, a best mode for carrying out the present invention will be described by using an embodiment. FIG. 1 is a block diagram showing an outline of a constitution of a hybrid automobile 20 loaded with a power output apparatus including an internal combustion engine system which is one embodiment of the present invention. The hybrid automobile 20 of the embodiment includes an engine 22, a three shaft-type power distribution and integration mechanism 30 connected to a crankshaft 26 as an output shaft of the engine 22 via a damper 28, a motor MG1 connected to the power distribution and integration mechanism 30 and capable of generating electric power, a reduction gear 35 mounted to a ring gear shaft 32a as a drive shaft connected to the power distribution and integration mechanism 30, a motor MG2 connected to the reduction gear 35, and a hybrid electronic control unit 70 controlling the entire power output apparatus.

Figure 2:
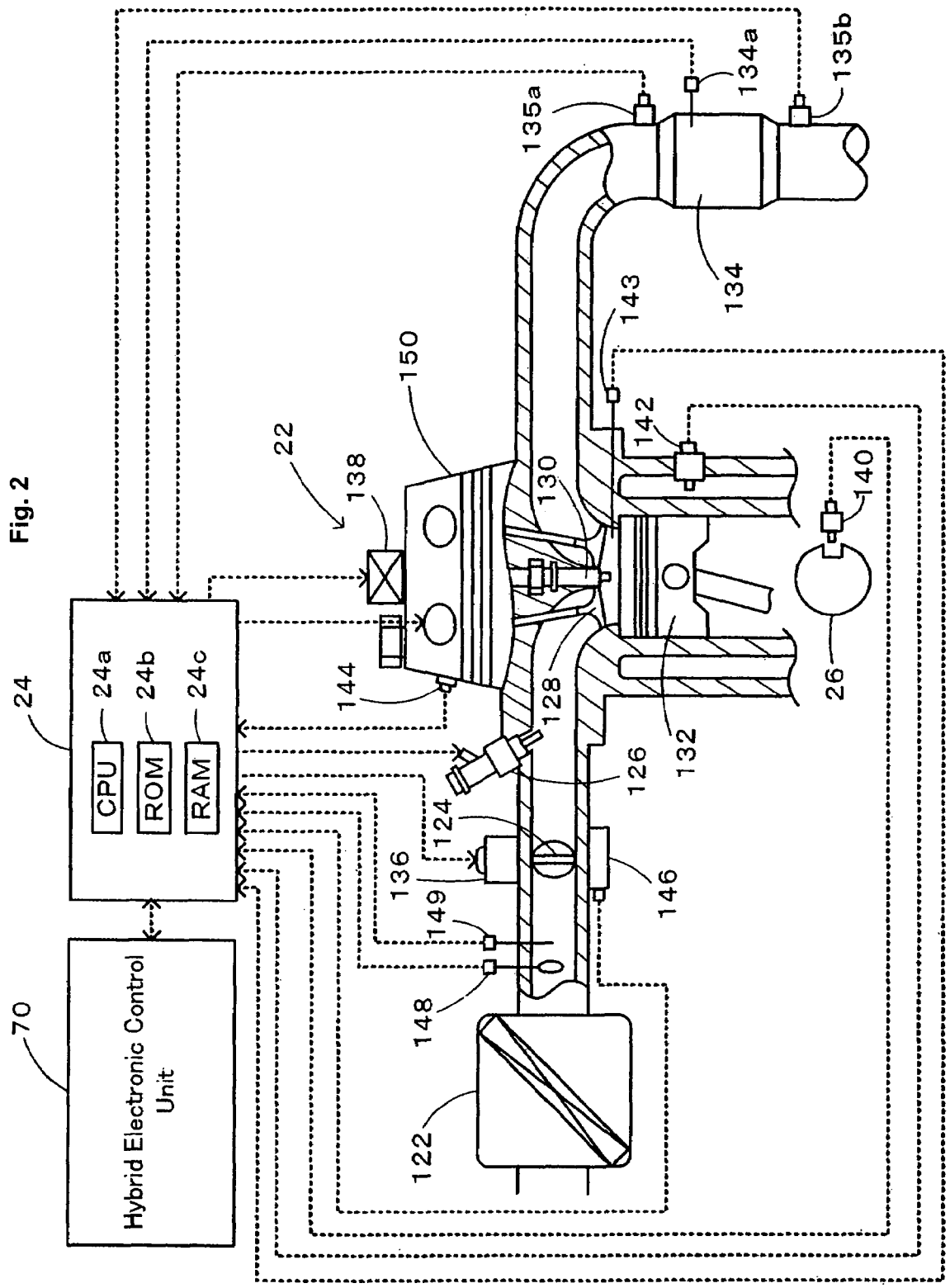
FIG. 2 is a block diagram showing an outline of a constitution of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a purifier 134 which includes three-way catalyst to convert toxic components included in the exhaust, that is, carbon monoxide (CO), hydrocarbons (HC), and nitrogen oxides (NOx), into harmless components, and is discharged to the outside air.

Figure 3:
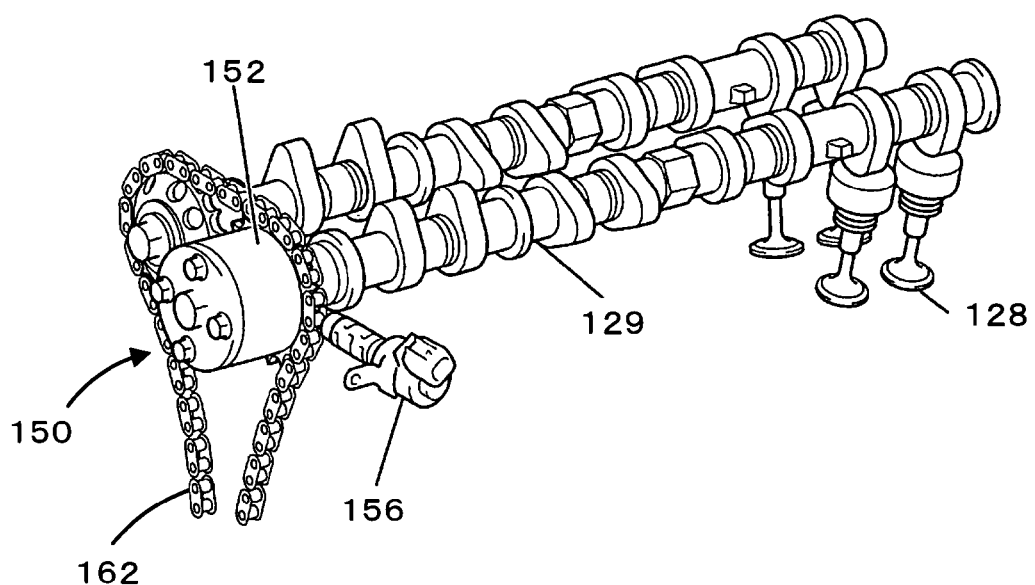
FIG. 3 is an external schematic view showing an external constitution of a variable valve timing mechanism 150.
Figure 4:
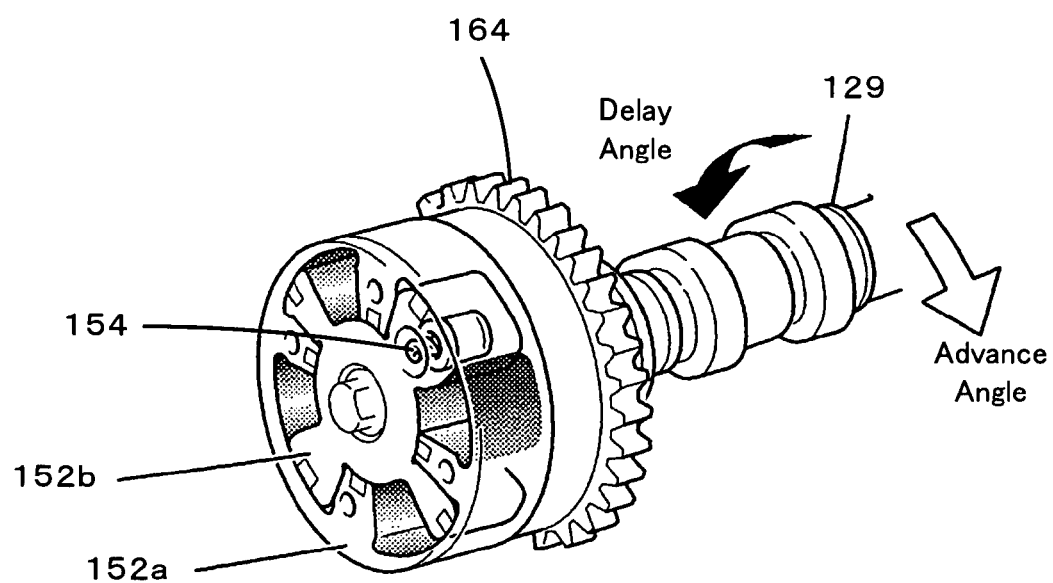
FIG. 4 is a schematic view showing an outline of a constitution of the variable valve timing mechanism 150.
Figure 5:
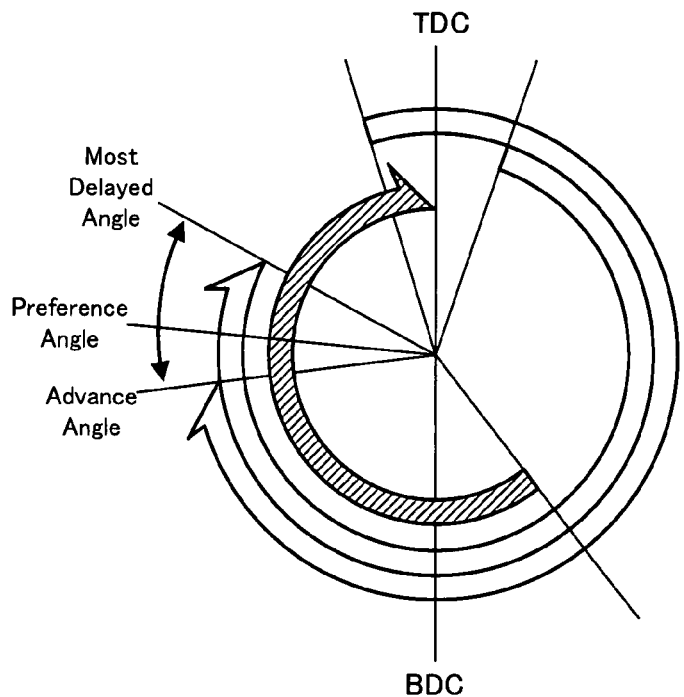
FIG. 5 is an explanatory diagram showing one example of opening and closing timing of an intake valve 128 when an angle of an intake camshaft 129 is advanced and opening and closing timing of the intake valve 128 when the angle of the intake camshaft 129 is delayed.

The engine 22 includes a variable valve timing mechanism 150 capable of continuously changing an opening and closing timing VT of an intake valve 128. FIGS. 3 and 4 show schematic views showing the outline of the constitution of the variable valve timing mechanism 150. As shown in the drawings, the variable valve timing mechanism 150 includes a vane type VVT controller 152 constituted of a housing part 152a fixed to a timing gear 164 connected to the crankshaft 26 via a timing chain 162, and a vane part 152b fixed to an intake camshaft 129 which opens and closes the intake valve 128, and an oil control valve 156 which causes hydraulic pressure to act on an advance angle chamber and a delay angle chamber of the VVT controller 152, and relatively rotates the vane part 152b with respect to the housing part 152a by regulating the hydraulic pressure which is caused to act on the advance angle chamber and the delay angle chamber of the VVT controller 152 via the oil control valve 156, and continuously changes the angle of the intake camshaft 129 in the opening and closing timing VT of the intake valve 128. FIG. 5 shows an example of each of the opening and closing timing VT of the intake valve 128 when the angle of the intake camshaft 129 is advanced, and the opening and closing timing VT of the intake valve 128 when the angle of the intake camshaft 129 is delayed. The embodiment is constituted such that the angle of the intake camshaft 129 in the opening and closing timing VT of the intake valve 128 in which power is efficiently output from the engine 22 is set as the reference angle, the operating state capable of outputting high torque from the engine 22 can be provided by advancing the angle of the intake camshaft 129 from the reference angle, and the operating state suitable for stopping and starting the engine 22 can be provided by making the pressure variation in the cylinders of the engine 22 small by the most delaying the angle of the intake camshaft 129.

Figure 6:
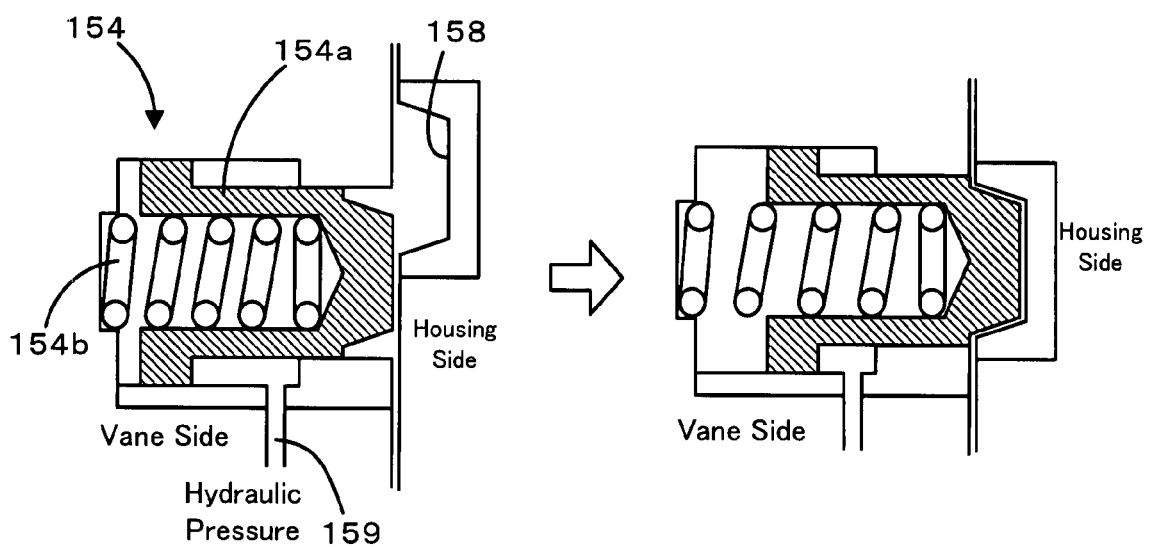
FIG. 6 is a schematic view showing an outline of a constitution of a lock pin 154.

The vane part 152b of the VVT controller 152 is mounted with a lock pin 154 which fixes relative rotation of the housing part 152a and the vane part 152b. FIG. 6 shows a schematic view showing the outline of the constitution of the lock pin 154. As shown in the drawing, the lock pin 154 includes a lock pin body 154a, and a spring 154b mounted so as to urge the lock pin body 154a in the direction of the housing part 152a, and is fitted in a groove 158 formed in the housing part 152a by a spring force of the spring 154b to fix the vane part 152b to the housing part 152a when the angle of the intake camshaft 129 is located at the most delayed angle. The lock pin 154 is provided with a hydraulic actuator not shown so as to be able to pull out the lock pin body 154a fitted in the groove 158 by exerting hydraulic pressure surpassing the spring force of the spring 154b through an oil path 159.

The engine 22 is controlled by an engine electronic control unit (hereinafter, called an engine ECU) 24. The engine ECU 24 is configured as a microprocessor with a CPU 24a as a center, and includes a ROM 24b storing processing programs, a RAM 24c temporarily storing data, and an input/output port and a communication port not shown, in addition to the CPU 24a. The engine ECU 24 inputs therein, via the input port, signals from various sensors which detect the state of the engine 22, a crank position from a crank position sensor 140 which detects the rotational position of the crankshaft 26, a cooling water temperature θw from a water temperature sensor 142 which detects the temperature of the cooling water of the engine 22, pressure Pin in a cylinder from a pressure sensor 143 mounted in a combustion chamber, cam positions from a cam position sensor 144 which detects rotational positions of the intake camshaft 129 of the intake valve 128 and an exhaust camshaft opening and closing an exhaust valve, which perform intake and exhaust to and from a combustion chamber, a throttle opening degree TH from a throttle valve position sensor 146 which detects the position of a throttle valve 124, an intake air flow Qa from an air flow meter 148 which is mounted to an intake pipe and detects the mass flow rate of intake air, intake air temperature from a temperature sensor 149 which is also mounted to the intake pipe, a catalyst temperature θc from a temperature sensor 134a which detects the temperature of a three way catalyst of a purifier 134, an air-fuel ratio AF from an air-fuel ratio sensor 135a, an oxygen signal from an oxygen sensor 135b and the like. Further, the engine ECU 24 outputs, via the output port, various control signals for driving the engine 22, for example, a drive signal to a fuel injection valve 126, a drive signal to a throttle motor 136 which adjusts the position of the throttle valve 124, a control signal to an ignition coil 138 integrated with an igniter, a control signal to the variable valve timing mechanism 150 capable of changing the opening and closing timing VT of the intake valve 128, and the like. The engine ECU 24 communicates with a hybrid electronic control unit 70, and controls the operation of the engine 22 in accordance with the control signal from the hybrid electronic control unit 70 and outputs data relating to the operation state of the engine 22 in accordance with necessity.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 7:
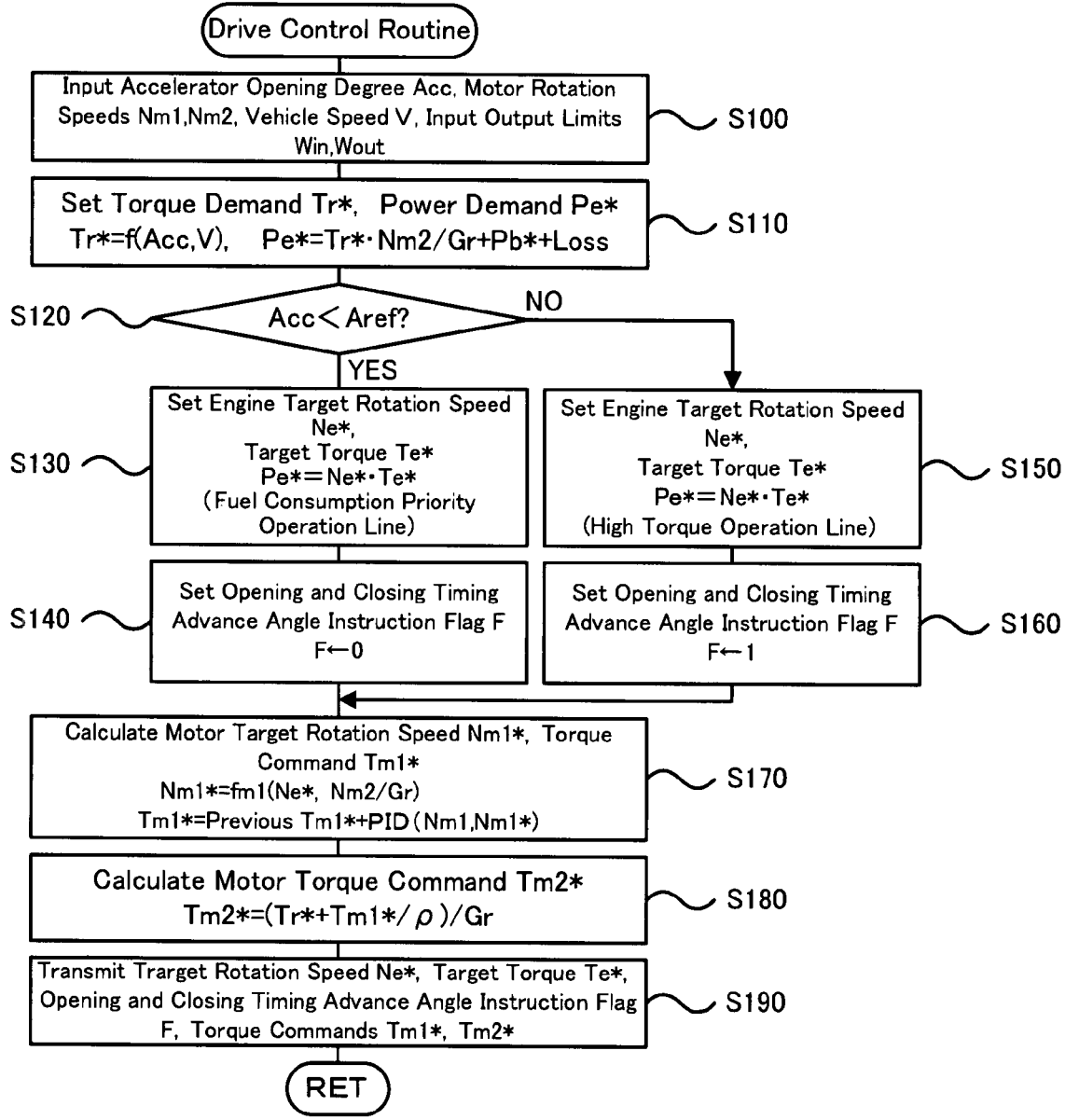
FIG. 7 is a flow chart showing one example of a drive control routine executed by a hybrid electronic control unit 70 of an example.

Next, the operation of the hybrid automobile 20 of the embodiment thus constituted will be described. FIG. 7 is a flow chart showing an example of a drive control routine executed by the hybrid electronic control unit 70. The routine is repeatedly executed every predetermined time (for example, every several msec).

When the drive control routine is executed, a CPU 72 of the hybrid electronic control unit 70 first executes the processing of inputting data necessary for control, such as an accelerator opening degree Acc from an accelerator pedal position sensor 84, a vehicle speed V from a vehicle speed sensor 88, and rotation speeds Nm1 and Nm2 of the motors MG1 and MG2 (step S100). In this case, as the rotation speeds Nm1 and Nm2 of the motors MG1 and MG2, the ones that are calculated based on the rotational positions of rotors of the motors MG1 and MG2 detected by rotational position detection sensors 43 and 44 are input from the motor ECU 40 by communication.

Figure 8:
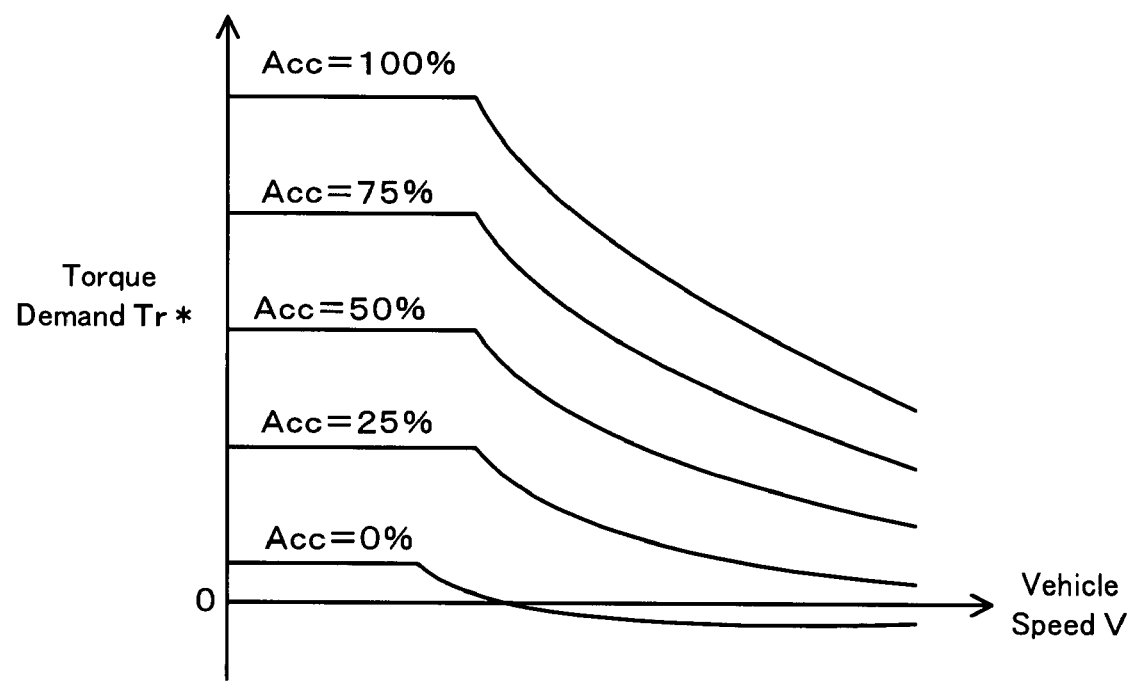
FIG. 8 is an explanatory diagram showing one example of a torque demand setting map.

After the data are thus input, based on the input accelerator opening degree Acc and vehicle speed V, as the torque demanded of the vehicle, torque demand Tr* to be output to the ring gear shaft 32a as the drive shaft connected to drive wheels 63a and 63b, and power demand Pe* demanded of the engine 22 are set (step S110). The torque demand Tr* is set in this embodiment by setting the relationship of the accelerator opening degree Acc, the vehicle speed V and the torque demand Tr* in advance and storing it in an ROM 74 as a torque demand setting map, and by deriving the corresponding torque demand Tr* from the stored map when the accelerator opening degree Acc and the vehicle speed V are given. FIG. 8 shows an example of the torque demand setting map. The power demand Pe* can be calculated as the sum of what is obtained by multiplying the set torque demand Tr* by the rotation speed Nr of the ring gear shaft 32a, charge/discharge power demand Pb* demanded by the battery 50, and a loss Loss. The rotation speed Nr of the ring gear shaft 32a can be obtained by multiplying the vehicle speed V by a conversion factor, or by dividing the rotation speed Nm2 of the motor MG2 by the gear ratio Gr of the reduction gear 35.

Figure 9:
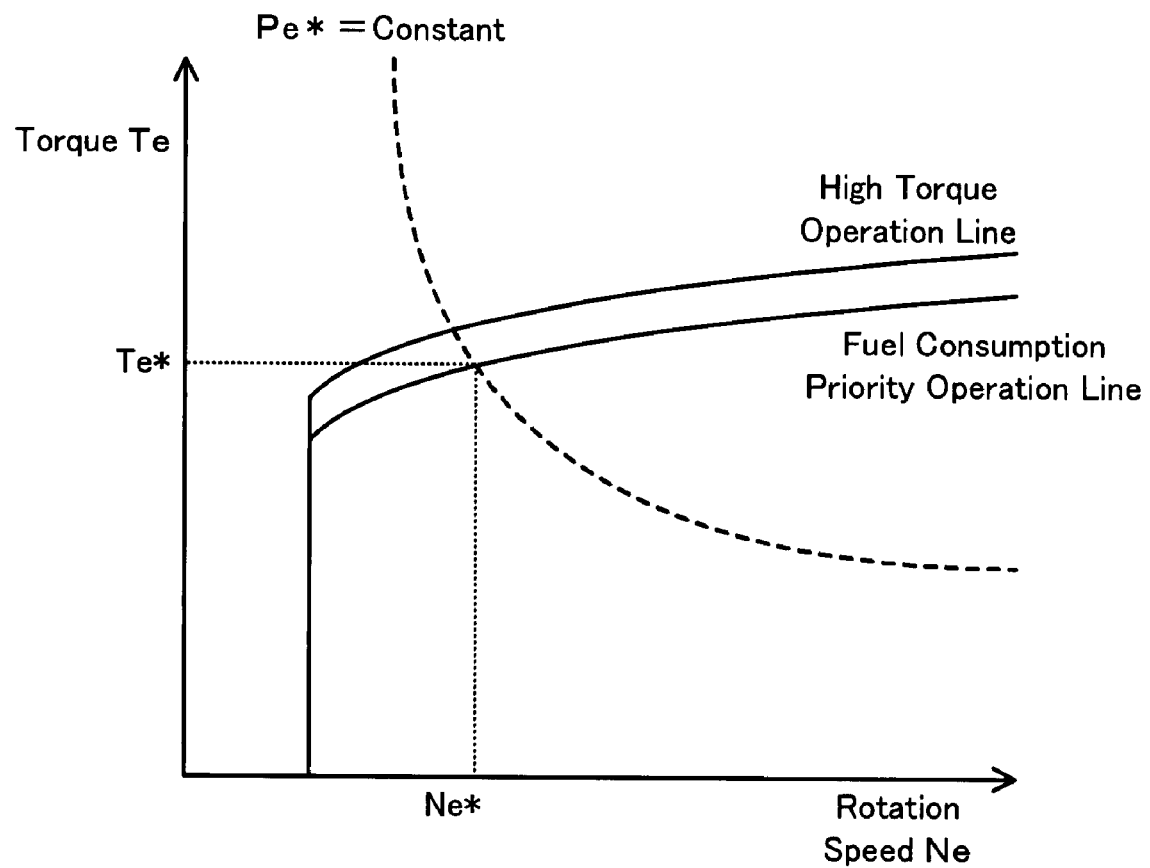
FIG. 9 is an explanatory diagram showing one example of a fuel consumption priority operation line and a high torque operation line of an engine 22, and a state of setting a target rotation speed Ne* and a target torque Te*.

Subsequently, the accelerator opening degree Acc is compared with a threshold value Aref (step S120). In this case, the threshold value Aref is a threshold value used for determining whether or not the output of high torque is demanded by an operator, and, for example, 40%, 50%, 60% or the like can be set. When the accelerator opening degree Acc is smaller than the threshold value Aref, it is determined that the output of high torque is not demanded, and a target rotation speed Ne* and target torque Te* as operation points of the engine 22 when the power demand Pe* is output are set by using a fuel consumption priority operation line which is a constraint for efficiently operating the engine 22 (step S130), and value 0 is set to an opening and closing timing advance angle instruction flag F for making the opening and closing timing VT of the intake valve 128 to the advance angle side (step S140). When the accelerator opening degree Acc is the threshold value Aref or more, it is determined that the output of high torque is demanded, the target rotation speed Ne* and the target torque Te* as operation points of the engine 22 when the power demand Pe* is output are set by using a high torque operation line which is a constraint for outputting high torque at the same rotation speed as compared with the constraint of efficiently operating the engine 22 (step S150), and value 1 is set to the opening and closing timing advance angle instruction flag F (step S160). FIG. 9 shows one example of each of the fuel consumption priority operation line and the high torque operation line, and the state of setting the target rotation speed Ne* and the target torque Te*. As is understood from FIG. 9, the high torque operation line is at the high torque side from the fuel consumption priority operation line. As shown in the drawing, the target rotation speed Ne* and the target torque Te* can be obtained by the intersection point of the fuel consumption priority operation line or the high torque operation line, and the curved line with the power demand Pe* (Ne*×Te*) fixed.

Figure 10:
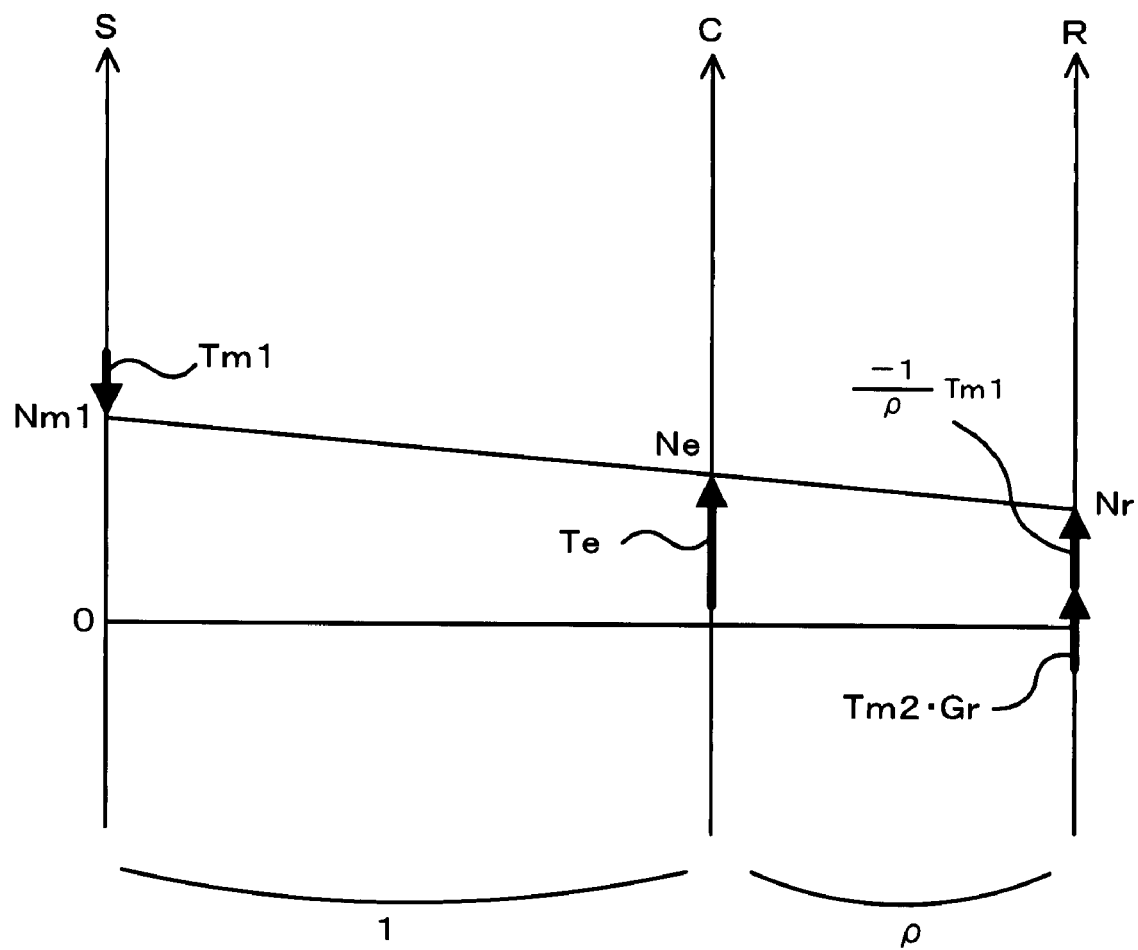
FIG. 10 is an explanatory view showing one example of an alignment chart for dynamically explaining rotation elements of a power distribution and integration mechanism 30.

Next, by using the set target rotation speed Ne*, the rotation speed Nr (Nm2/Gr) of the ring gear shaft 32a, and a gear ratio ρ of the power distribution and integration mechanism 30, a target rotation speed Nm1* of the motor MG1 is calculated from the following formula (1), a torque command Tm1* of the motor MG1 is calculated from formula (2) based on the calculated target rotation speed Nm1* and the present rotation speed Nm1 (step S170), and by using the torque demand Tr*, the torque command Tm1*, the gear ratio ρ of the power distribution and integration mechanism 30, and the gear ratio Gr of the reduction gear 35, a torque command Tm2* of the motor MG2 is calculated from formula (3) (step S180). Here, the formula (1) is a dynamical relational expression with respect to rotation elements of the power distribution and integration mechanism 30. FIG. 10 shows an alignment chart showing the dynamical relationship of the rotation speed and the torque in the rotation elements in the power distribution and integration mechanism 30. In the drawing, an S-axis on the left represents the rotation speed of a sun gear 31 which is the rotation speed Nm1 of the motor MG1, a C-axis represents the rotation speed of a carrier 34 which is the rotation speed Ne of the engine 22, and an R-axis represents a rotation speed Nr of a ring gear 32 which is obtained by dividing the rotation speed Nm2 of the motor MG2 by the gear ratio Gr of the reduction gear 35. The two thick arrows on the R-axis represent the torque which is the result of the torque Tm1, which is output from the motor MG1, acting on the ring gear shaft 32a, and the torque which is the result of the torque Tm2, which is output from the motor MG2, acting on the ring gear shaft 32a via the reduction gear 35. The formula (1) and formula (3) can be easily derived by using the alignment chart. Further, the formula (2) is the relational formula in the feedback control for rotating the motor MG1 at the target rotation speed Nm1*, and "k1" in the second term in the right side in the formula (2) is a gain of the proportional term, and "k2" of the third term of the right side is a gain of the integral term.

$$Nm1^* = Ne^* \cdot (1+\rho)/\rho - Nm2/(Gr \cdot \rho) \quad (1)$$

$$Tm1^* = \text{previous time } Tm1^* + k1(Nm1^* - Nm1) + k2 \int (Nm1^* - Nm1) dt \quad (2)$$

$$Tm2^* = (Tr^* + Tm1^*/\rho)/Gr \quad (3)$$

After the target rotation speed Ne* and the target torque Te* of the engine 22, the opening and closing timing advance angle instruction flag F, and the torque commands Tm1* and Tm2* of the motors MG1 and MG2 are thus set, the target rotation speed Ne* and the target torque Te* of the engine 22 and the opening and closing timing advance angle instruction flag F are transmitted to the engine ECU 24, and the torque commands Tm1* and Tm2* of the motors MG1 and MG2 are transmitted to the motor ECU 40 (step S190), and the drive control routine is finished. The motor ECU 40 which receives the torque commands Tm1* and Tm2* conducts switching control of the switching elements of inverters 41 and 42 so that the motor MG1 is driven by the torque command Tm1* and the motor MG2 is driven by the torque command Tm2*.

Next, the operation of the engine 22 when the target rotation speed Ne*, the target torque Te* and the opening and closing timing advance angle instruction flag F are set will be described. The engine ECU 24 which receives the target rotation speed Ne*, the target torque Te* and the opening and closing timing advance angle instruction flag F transmitted from the hybrid electronic control unit 70 conducts control such as intake air flow control, fuel injection control, ignition control, and opening and closing timing control of the intake valve 128 in the engine 22 so that the engine 22 is operated at the operation point indicated by the target rotation speed Ne* and the target torque Te*. On this occasion, the opening and closing timing control of the intake valve 128 is conducted with the value of the opening and closing timing advance angle instruction flag F taken into consideration. Hereinafter, the opening and closing timing control of the intake valve 128 and the fuel injection control will be described. Further explanation of the intake air flow control and ignition control will be omitted, since they do not form the core of the present invention.

Figure 11:
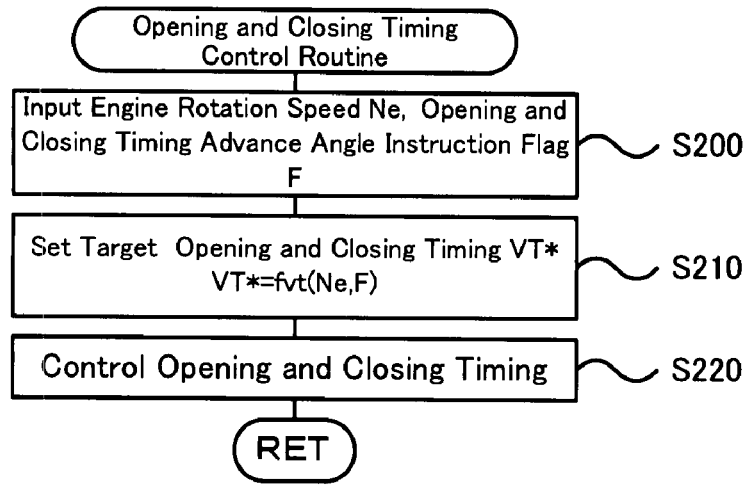
FIG. 11 is a flow chart showing one example of an opening and closing timing control routine executed by an engine ECU 24.

First, the opening and closing timing control of the intake valve 128 will be described. FIG. 11 is a flow chart showing one example of an opening and closing timing control routine executed by the engine ECU 24. The routine is executed when the engine ECU 24 receives the target rotation speed Ne* and the target torque Te* transmitted from the hybrid electronic control unit 70.

Figure 12:
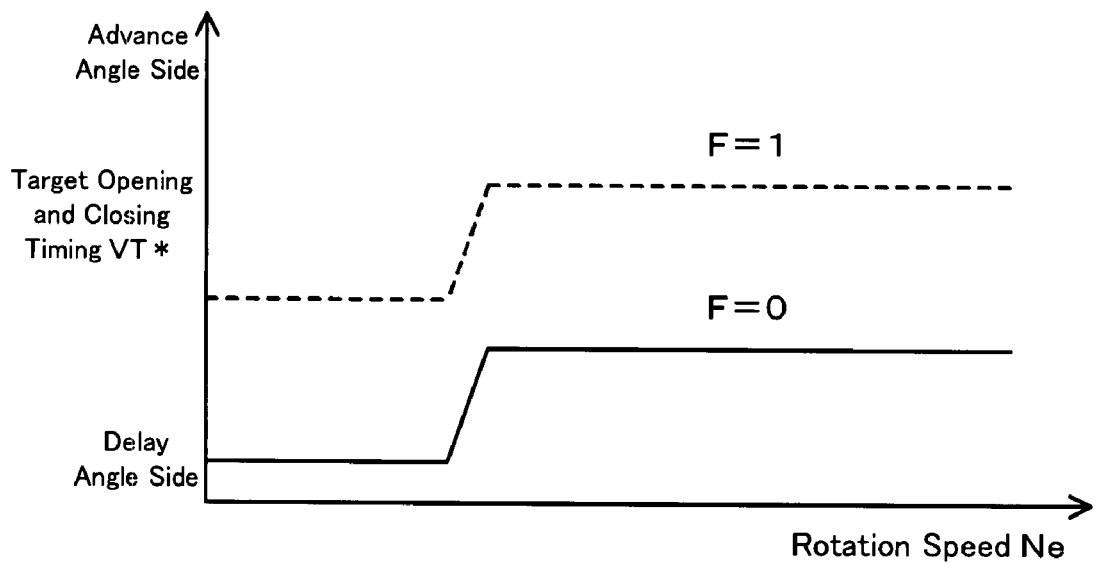
FIG. 12 is an explanatory view showing one example of a target opening and closing timing setting map.

When the opening and closing timing control routine is executed, the CPU 24a of the engine ECU 24 inputs therein the rotation speed Ne of the engine 22 and the opening and closing timing advance angle instruction flag F (step S200), sets a target opening and closing timing VT* of the intake valve 128 based on the rotation speed Ne of the engine 22 and the opening and closing timing advance angle instruction flag F which are input (step S210), controls the variable valve timing mechanism 150 so that the opening and closing timing VT of the intake valve 128 becomes the target opening and closing timing VT* (step S220), and finishes the opening and closing timing control routine. Here, as the rotation speed Ne of the engine 22, the rotation speed Ne which is calculated by an engine rotation speed calculation routine not shown based on the signal from the crank position sensor 140 mounted to the crankshaft 26 and written in a predetermined address of the RAM 24c is read and input. As the timing advance angle instruction flag F, the one set by the hybrid electronic control unit 70 is input by communication. Further, the target opening and closing timing VT* is set by setting in advance the relationship of the rotation speed Ne of the engine 22, the advance angle instruction flag F and the target opening and closing timing VT*, storing the relationship as the target opening and closing timing setting map, and deriving the corresponding target opening and closing timing VT* from the stored map when the rotation speed Ne of the engine 22 and the opening and closing timing advance angle instruction flag F are given. One example of the target opening and closing timing setting map is shown in FIG. 12. As shown in the drawing, the target opening and closing timing VT* is set so that it goes to the advance angle side as the rotation speed Ne of the engine 22 is higher, and when the value of the opening and closing timing advance angle instruction flag F is one, as compared with the value zero. The former is the value with fuel consumption taken into consideration, and the latter is the value with output of high torque from the engine 22 taken into consideration.

Figure 13:
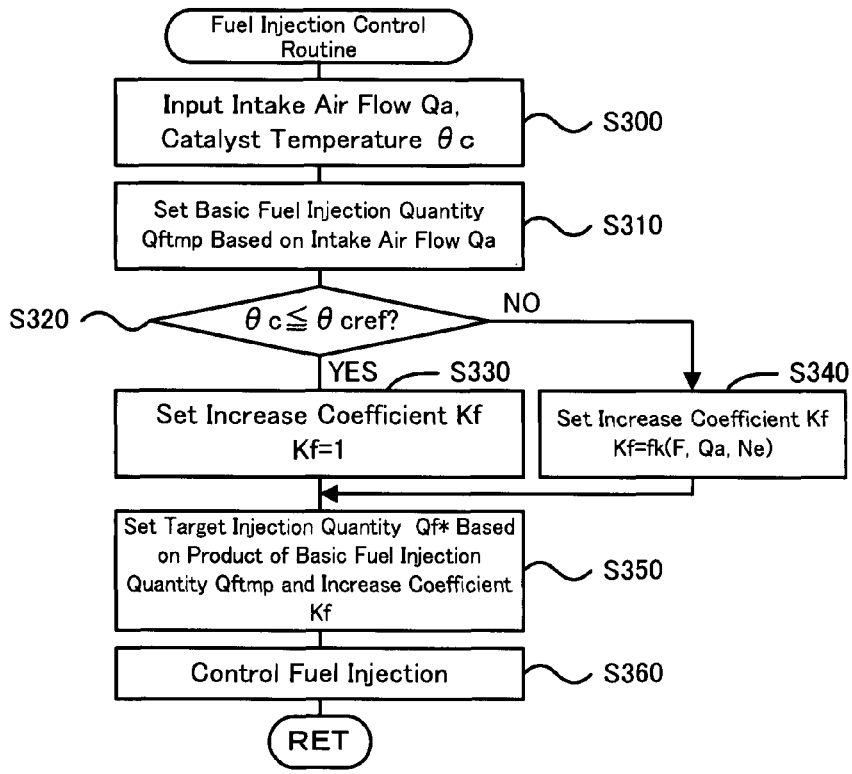
FIG. 13 is a flow chart showing one example of a fuel injection control routine executed by the engine ECU 24.

Next, fuel injection control will be described. FIG. 13 is a flow chart showing one example of a fuel injection control routine executed by the engine ECU 24. The routine is repeatedly executed every predetermined time. When the fuel injection control routine is executed, the CPU 24a of the engine ECU 24 first inputs therein the intake air flow Qa from the air flow meter 148 and the catalyst temperature θc from the temperature sensor 134a (step S300), and sets a basic fuel injection quantity Qftmp which becomes a target air-fuel ratio (for example, a theoretical air-fuel ratio or the like) with respect to the input intake air flow Qa (step S310).

Subsequently, the CPU 24a compares the catalyst temperature θc with a threshold value θcref (step S320). Here, the threshold value θcref can be set as the lower limit or its vicinity of the catalyst temperature θc at which increase of fuel is required to suppress deterioration of the three-way catalyst of the purifier 134, and determined in accordance with the characteristics or the like of the three-way catalyst, and the value of, for example, 900° C., 920° C., 940° C. or the like can be used. Now, the state of the three-way catalyst at a relatively high temperature is considered. In this case, if the three-way catalyst is exposed to a lean atmosphere, catalyst deterioration easily advances. Accordingly, fuel to be supplied to the engine 22 needs to be increased to cool the three-way catalyst. Comparison of the catalyst temperature θc and the threshold value θcref in step S320 is the processing of determining whether increase of fuel to lower the catalyst temperature θc is demanded or not.

When the catalyst temperature θc is the threshold value θcref or lower, it is determined that increase of fuel to lower the catalyst temperature θc is not demanded, the value 1.0 is set to an increase coefficient Kf (step S330), the product of the basic fuel injection quantity Qftmp, the increase coefficient Kf (value 1.0) and other correction coefficients (for example, a correction coefficient based on transition time such as acceleration or reduction time, a correction coefficient based on an air-fuel ratio feedback and the like) is set as a target fuel injection quantity Qf* (step S350), valve opening time of the fuel injection valve 126 is controlled so that fuel injection of the set target fuel injection quantity Qf* is performed (step S360), and the fuel injection control routine is finished. In this case, if the other correction coefficients (correction coefficients other than the increase coefficient Kf) are not taken into consideration for simplification, the basic fuel injection quantity Qftmp is directly set as the target fuel injection quantity Qf*.

Figure 14:
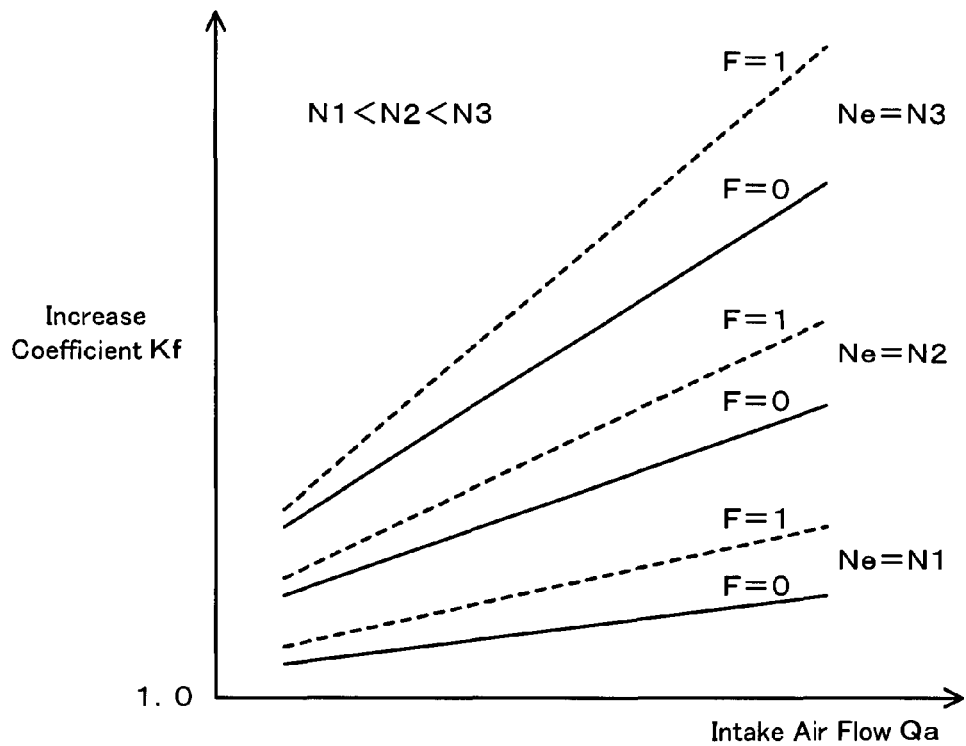
FIG. 14 is an explanatory diagram showing one example of an increase coefficient setting map.

When the catalyst temperature θc is higher than the threshold value θcref in step S320, it is determined that increase of fuel to lower the catalyst temperature θc is demanded, the increase coefficient Kf is set based on the opening and closing timing advance angle instruction flag F; the intake air flow Qa and the rotation speed Ne of the engine 22 (step S340), the product of the basic fuel injection quantity Qftmp, the increase coefficient Kf, and the other correction coefficients is set as the target fuel injection quantity Qf* (step S350), the valve opening time of the fuel injection valve 126 is controlled so that fuel injection of the set target fuel injection quantity Qf* is performed (step S360), and the fuel injection control routine is finished. Here, as the increase coefficient Kf, the relationship of the opening and closing timing advance angle instruction flag F, the intake air flow Qa, the rotation speed Ne of the engine 22 and the correction coefficient K is set in advance and stored in the ROM 24b as the increase coefficient setting map, and when the opening and closing timing advance angle instruction flag F, the intake air flow Qa and the rotation speed Ne of the engine 22 are given, the corresponding increase coefficient Kf is derived from the stored map and set, in this embodiment. One example of the increase coefficient setting map is shown in FIG. 14. As shown in the drawing, the increase coefficient Kf is set so as to tend to be larger as the intake air flow Qa is larger, the rotation speed Ne of the engine 22 is higher, the opening and closing timing VT of the intake valve 128 is toward the advance angle side. This is for the following reason. Now, the case where the catalyst temperature θc is higher than the threshold value θcref is considered, and it is conceivable that as the intake air flow Qa is larger, the rotation speed Ne of the engine 22 is higher, and the opening and closing timing VT of the intake valve 128 is toward the advance angle side, the operation state of the engine 22 tends to be in a lean state. If a constant increase is performed irrespective of the intake air flow Qa, the rotation speed Ne of the engine 22, and the opening and closing timing VT of the intake valve 128 on the occasion of performing increase of fuel so that the operation state of the engine 22 is not in the lean state, fuel consumption is worsened by performing increase of fuel more than demanded when the intake air flow Qa and the rotation speed Ne of the engine 22 are relatively small and the opening and closing timing VT of the intake valve 128 is not so advanced (when the opening and closing timing advance angle instruction flag F has the value 0), and when the intake air flow Qa and the rotation speed Ne of the engine 22 are relatively large, and the opening and closing timing VT of the intake valve 128 is relatively advanced (when the opening and closing timing advance angle instruction flag F has the value 1), the catalyst temperature θc sometimes cannot be lowered sufficiently due to insufficient increase of fuel. Accordingly, in this embodiment, the increase coefficient Kf is set so as to tend to be larger, as the intake air flow Qa is larger, the rotation speed Ne of the engine 22 is higher, and the opening and closing timing VT of the intake valve 128 is toward the advance angle side. By setting the increase coefficient Kf in consideration of the opening and closing timing advance angle instruction flag F used for setting of the opening and closing timing VT of the intake valve 128 in addition to the intake air flow Qa and the rotation speed Ne of the engine 22 when the catalyst temperature θc is higher than the threshold value θcref like this, the target fuel injection quantity Qf* can be set more properly by using the opening and closing timing VT of the intake valve 128.

According to the hybrid automobile 20 of the embodiment described above, the target fuel injection quantity Qf* is set to be larger when the opening and closing timing of the intake valve 128 is advanced as compared when it is not advanced, and therefore, the target fuel injection quantity Qf* can be more properly set by reflecting the opening and closing timing VT of the intake valve 128. As a result, the engine 22 can be operated more properly. In addition, the target fuel injection quantity Qf* is set by also using the intake air flow Qa and the rotation speed Ne of the engine 22, and therefore, the target fuel injection quantity Qf* reflecting the intake air flow Qa and the rotation speed Ne of the engine 22 can be set.

In the hybrid automobile 20 of the embodiment, when the catalyst temperature θc is higher than the threshold value θcref, the increase coefficient Kf is set based on the opening and closing timing advance angle instruction flag F, the intake air flow Qa and the rotation speed Ne of the engine 22, but the increase coefficient Kf may be set without using one or both of the intake air flow Qa and the rotation speed Ne of the engine 22.

In the hybrid automobile 20 of the embodiment, when the catalyst temperature θc is higher than the threshold value θcref, the increase coefficient Kf is set based on the opening and closing timing advance angle instruction flag F, the intake air flow Qa and the rotation speed Ne of the engine 22, but the increase coefficient Kf may be set by using the opening and closing timing VT of the intake valve 128, instead of the opening and closing timing advance angle instruction flag F among them. Here, as the opening and closing timing VT of the intake valve 128, the target opening and closing timing VT* set in the opening and closing timing control routine in FIG. 11 may be used. In this case, the increase coefficient Kf is set so as to tend to be larger as the opening and closing timing VT of the intake valve 128 is toward the advance angle side in the range of the value it can take.

In the hybrid automobile 20 of the embodiment, when the catalyst temperature θc is higher than the threshold value θcref, the increase coefficient Kf is set based on the opening and closing timing advance angle instruction flag F, the intake air flow Qa and the rotation speed Ne of the engine 22, and when the catalyst temperature θc is the threshold value θcref or lower, the value 1 is set as the increase coefficient Kf, but the increase coefficient Kf may be set based on the opening and closing timing advance angle instruction flag F, the intake air flow Qa and the rotation speed Ne of the engine 22, irrespective of the catalyst temperature θc.

In the hybrid automobile 20 of the embodiment, the opening and closing timing advance angle instruction flag F is set by using the accelerator opening degree Acc, but the opening and closing timing advance angle instruction flag F may be set by using, for example, the torque demand Tr*, instead of the accelerator opening degree Acc.

Figure 15:
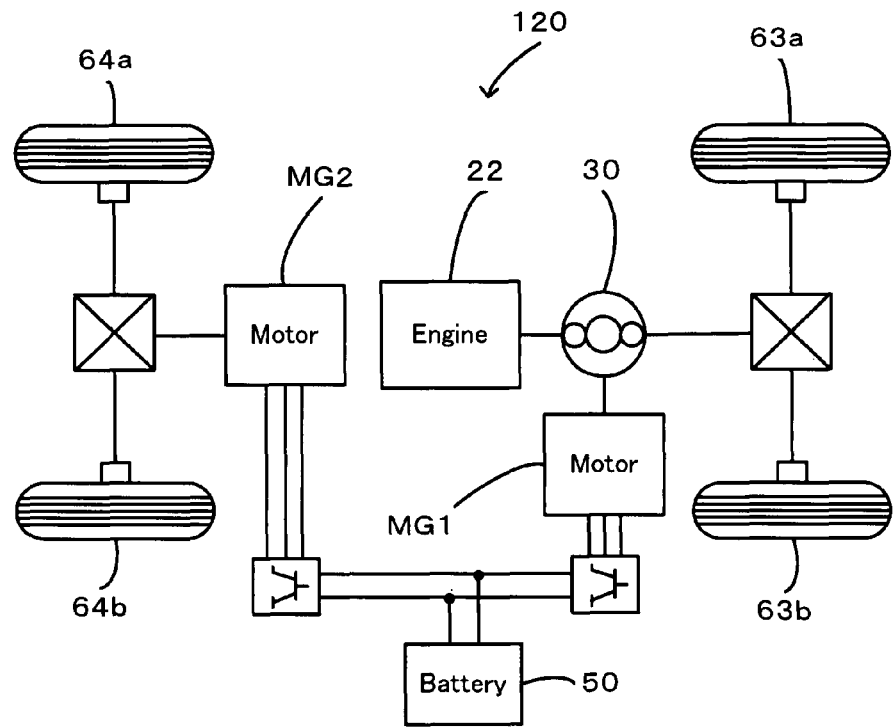
FIG. 15 is an explanatory diagram showing an outline of a constitution of a hybrid automobile 120 of a modified example.

In the hybrid automobile 20 of the embodiment, the power of the motor MG2 is changed by the reduction gear 35 and output to the ring gear shaft 32a, but, as shown in a hybrid automobile 120 of a modified example in FIG. 15 as an example, the power of the motor MG2 may be connected to an axle (axle connected to wheels 64a and 64b in FIG. 15) differing from the axle (axle to which the drive wheels 63a and 63b are connected) to which the ring gear shaft 32a is connected.

Figure 16:
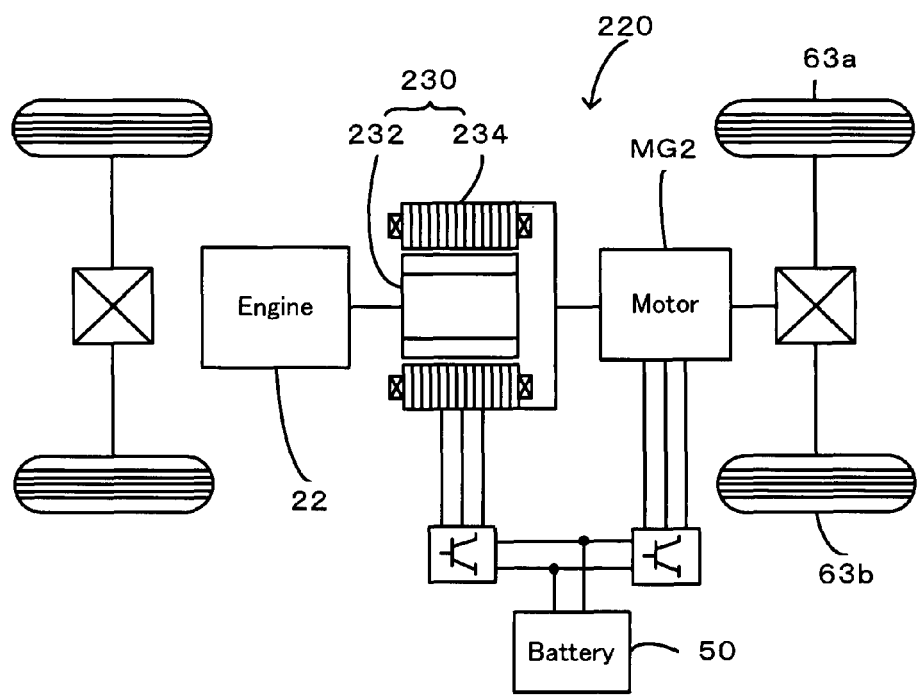
FIG. 16 is an explanatory diagram showing an outline of a constitution of a hybrid automobile 220 of a modified example.

In the hybrid automobile 20 of the embodiment, the power of the engine 22 is output to the ring gear shaft 32a as the drive shaft connected to the drive wheels 63a and 63b via the power distribution and integration mechanism 30, but as shown in a hybrid automobile 220 of a modified example of FIG. 16 as an example, a pair-rotor motor 230 which has an inner rotor 232 connected to the crankshaft 26 of the engine 22, and an outer rotor 234 connected to a drive shaft outputting power to the drive wheels 63a and 63b, and transmits part of the power of the engine 22 to the drive shaft and converts the residual power into electric power may be included.

Here, the correspondence of the main elements in the embodiments and modified examples and the main elements of the invention described in the Summary will be described. In the embodiments, the variable valve timing mechanism 150 capable of changing the opening and closing timing VT of the intake valve 128 corresponds to "the opening and closing timing changing module", the fuel injection valve 126 which injects gasoline corresponds to "the fuel injection module", the engine ECU 24 which executes the processing of setting the increase coefficient Kf based on the opening and closing timing advance angle instruction flag. F, the intake air flow Qa and the rotation speed Ne of the engine 22 and setting the target fuel injection quantity Qf* based on the product of the basic fuel injection quantity Qftmp to be the target air-fuel ratio with respect to the intake air flow Qa and the increase coefficient Kf, when the catalyst temperature θc is higher than the threshold value θcref, corresponds to "the target fuel injection quantity setting module", and the engine ECU 24 which executes the processing of controlling the valve opening time of the fuel injection valve 126 so that fuel injection of the set target fuel injection quantity Qf* is performed corresponds to "the fuel injection control module". The power distribution and integration mechanism 30 connected to the crankshaft 26 of the engine 22 and the ring gear shaft 32a as the drive shaft and the motor MG1 connected to the power distribution and integration mechanism 30 correspond to "rotation regulating module", and the motor MG2 connected to the ring gear shaft 32a corresponds to "the motor". In the modified example, the engine ECU 24 which executes the processing of setting the target fuel injection quantity Qf* by using the increase coefficient Kf which is set based on the opening and closing timing VT of the intake valve 128, the intake air flow Qa and the rotation speed Ne of the engine 22 when the catalyst temperature θc is higher than the threshold value θcref corresponds to "the target fuel injection quantity setting module". Correspondence of the main elements of the embodiments and the modified examples and the main elements of the invention described in the Summary is one example for describing the best mode for carrying out the embodiments of the invention described in the Summary, and therefore, does not limit the elements of the invention described in the Summary. Namely, the interpretation of the invention described in the Summary should be performed based on the description of the Summary, and each of the embodiments is only a concrete example of the invention described in the Summary.

The present invention may be in a mode of the power output apparatus and the internal combustion engine system loaded on a movable body and the like such as an automobile, vehicle, ship and aircraft including internal combustion engine systems if only it includes an internal combustion engine system since it can perform the same control as the fuel injection control routine of the above describe embodiments, or the present invention may be in a mode of the power output apparatus and the internal combustion engine system incorporated into an immovable body such as construction equipment. Further, the present invention may be in a mode of a fuel injection control method of such an internal combustion engine system and a fuel injection control method of such a power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2006-305032 filed Nov. 10, 2006 including specification, drawings and claims is incorporated herein by reference in its entirety.

What is claimed is:

1. An internal combustion engine system having an opening and closing timing changing module capable of changing opening and closing timing of an intake valve of an internal combustion engine, said internal combustion engine system comprising:

a fuel injection module capable of injecting a fuel to each cylinder of said internal combustion engine;

an exhaust gas purifier including a catalyst for purifying exhaust gas from said internal combustion engine;

an advance angle instruction module which sets a value for an advance angle instruction flag for advancing opening and closing timing of said intake valve, wherein when predetermined high torque demand is made based on an operation of an operator, the value is set as one, and when it is determined that output of high torque is not demanded, the value is set as zero;

an opening and closing timing control module which controls said opening and closing timing changing module so that said intake valve is opened and closed in target opening and closing timing based on an operation state of said internal combustion engine and the value for the advance angle instruction flag;

a target fuel injection quantity setting module which sets a basic fuel injection quantity based on target power to be output from said internal combustion engine and a predetermined constraint and sets a target fuel injection quantity by performing an increase correction to said basic fuel injection quantity when a temperature of said catalyst is higher than a predetermined temperature, said increase correction being correction for increasing a fuel injection quantity to said internal combustion engine when the value for the advance angle instruction flag is one as compared to when the value for the advance angle instruction flag is zero; and a fuel injection control module which controls said fuel injection module so that fuel injection is performed based on said set target fuel injection quantity.

2. An internal combustion engine system according to claim 1, wherein said target fuel injection quantity setting module is a module which sets said target fuel injection quantity by using said increase correction based on the value for the advance angle instruction flag, a rotation speed of said internal combustion engine, and an intake air flow of said internal combustion engine.

3. An internal combustion engine system according to claim 2, wherein said target fuel injection quantity setting module is a module which sets said target fuel injection quantity by using said basic fuel injection quantity and said increase correction which increases a fuel injection quantity to said internal combustion engine as the rotation speed of said internal combustion engine is higher and as the intake air flow of said internal combustion engine is larger.

4. A vehicle, comprising:

an internal combustion engine;

an opening and closing timing changing module capable of changing opening and closing timing of an intake valve of said internal combustion engine;

a fuel injection module capable of injecting a fuel to each cylinder of said internal combustion engine;

an exhaust gas purifier including a catalyst for purifying exhaust gas from said internal combustion engine;

a rotation regulating module which is connected to an output shaft of said internal combustion engine, and a drive shaft independently rotatable with respect to the output shaft and connected to an axle, and capable of regulating a rotation speed of said output shaft with respect to said drive shaft with input and output of electric power and input and output of drive force to and from said output shaft and said drive shaft;

a motor capable of inputting and outputting power to and from said drive shaft;

an advance angle instruction module which sets a value for an advance angle instruction flag to advance opening and closing timing of said intake valve, wherein when predetermined high torque demand is made based on an operation of an operator, the value is set as one, and when it is determined that output of high torque is not demanded, the value is set as zero;

an opening and closing timing control module which controls said opening and closing timing changing module so that said intake valve is opened and closed in target opening and closing timing based on an operation state of said internal combustion engine and the value for the advance angle instruction flag;

a target fuel injection quantity setting module which sets a basic fuel injection quantity based on target power to be output from said internal combustion engine and a predetermined constraint and sets a target fuel injection quantity by performing an increase correction to said basic fuel injection quantity when a temperature of said catalyst is higher than a predetermined temperature, said increase correction being correction for increasing a fuel injection quantity to said internal combustion engine when the value for the advance angle instruction flag is one as compared to when the value for the advance angle instruction flag is zero; and a fuel injection control module which controls said fuel injection module so that fuel injection is performed based on said set target fuel injection quantity.

5. A method for controlling an internal combustion engine system including an opening and closing timing changing module capable of changing opening and closing timing of an intake valve of an internal combustion engine, and a fuel injection module capable of injecting a fuel to each cylinder of said internal combustion engine, and an exhaust gas purifier including a catalyst for purifying exhaust gas from said internal combustion engine, said method comprising:

setting a value for an advance angle instruction flag for advancing opening and closing timing of said intake valve, wherein when predetermined high torque demand is made based on an operation of an operator, the value is set as one, and when it is determined that output of high torque is not demanded, the value is set as zero;

controlling said opening and closing timing changing module so that said intake valve is opened and closed in target opening and closing timing based on an operation state of said internal combustion engine and the value for the advance angle instruction flag; and setting a basic fuel injection quantity based on target power to be output from said internal combustion engine and a predetermined constraint, setting a target fuel injection quantity by performing an increase correction to said basic fuel injection quantity when a temperature of said catalyst is higher than a predetermined temperature, said increase correction being correction for increasing a fuel injection quantity to said internal combustion engine when the value for the advance angle instruction flag is one as compared to when the value for the advance angle instruction flag is zero, and controlling said fuel injection module to perform fuel injection based on said set target fuel injection quantity.

6. A power output apparatus that outputs power to a drive shaft, said power output apparatus comprising:

an internal combustion engine;

an opening and closing timing changing module capable of changing opening and closing timing of an intake valve of said internal combustion engine;

a fuel injection module capable of injecting a fuel to each cylinder of said internal combustion engine;

an exhaust gas purifier including a catalyst for purifying exhaust gas from said internal combustion engine;

a rotation regulating module which is connected to an output shaft of said internal combustion engine, and said drive shaft independently rotatable with respect to said output shaft, and capable of regulating a rotation speed of said output shaft with respect to said drive shaft with input and output of electric power and input and output of drive force to and from said output shaft and said drive shaft;

a motor capable of inputting and outputting power to and from said drive shaft;

an advance angle instruction module which sets a value for an advance angle instruction flag to advance opening and closing timing of said intake valve, wherein when predetermined high torque demand is made based on an operation of an operator, the value is set as one, and when it is determined that output of high torque is not demanded, the value is set as zero;

an opening and closing timing control module which controls said opening and closing timing changing module so that said intake valve is opened and closed in target opening and closing timing based on an operation state of said internal combustion engine and the value for the advance angle instruction flag;

a target fuel injection quantity setting module which sets a basic fuel injection quantity based on target power to be output from said internal combustion engine and a predetermined constraint and sets a target fuel injection quantity by performing an increase correction to said basic fuel injection quantity when a temperature of said catalyst is higher than a predetermined temperature, said increase correction being correction for increasing a fuel injection quantity to said internal combustion engine when the value for the advance angle instruction flag is one as compared to when the value for the advance angle instruction flag is zero; and a fuel injection control module which controls said fuel injection module so that fuel injection is performed based on said set target fuel injection quantity.

7. A power output apparatus according to claim 6, wherein said rotation regulating module is a module including a three shaft-type power input output module which is connected to three shafts that are the output shaft of said internal combustion engine, said drive shaft and a third shaft, and inputs and outputs power to and from a remaining shaft based on power input and output to and from any two shafts among the three shafts, and a generator capable of inputting and outputting power to and from said third shaft.

* * * * *